United States Patent
Garhart et al.

(10) Patent No.: US 10,754,324 B2
(45) Date of Patent: Aug. 25, 2020

(54) COMPOSITE REPAIR DESIGN SYSTEM

(71) Applicant: Sikorsky Aircraft Corporation, Stratford, CT (US)

(72) Inventors: Jonathan K. Garhart, Seymour, CT (US); Michael Rene Urban, Southbury, CT (US); Thomas Arthur Carstensen, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 136 days.

(21) Appl. No.: 15/975,520

(22) Filed: May 9, 2018

(65) Prior Publication Data

US 2019/0346827 A1 Nov. 14, 2019

(51) Int. Cl.
*G05B 19/4099* (2006.01)
*B64F 5/40* (2017.01)

(52) U.S. Cl.
CPC ........... *G05B 19/4099* (2013.01); *B64F 5/40* (2017.01); *G05B 2219/35134* (2013.01); *G05B 2219/49007* (2013.01)

(58) Field of Classification Search
CPC .............................. G05B 19/4099; B64F 5/40
See application file for complete search history.

(56) References Cited

U.S. PATENT DOCUMENTS

| | | | | |
|---|---|---|---|---|
| 6,285,320 | B1 * | 9/2001 | Olster | G01S 1/08 342/463 |
| 7,925,454 | B1 * | 4/2011 | Narcus | G01D 21/00 340/679 |
| 8,670,893 | B2 | 3/2014 | Geddam et al. | |
| 9,508,047 | B2 | 11/2016 | Mciver et al. | |
| 2006/0010152 | A1 * | 1/2006 | Catalano | G06Q 10/06 |
| 2009/0197228 | A1 * | 8/2009 | Afshar | G06Q 10/06 434/219 |
| 2009/0234616 | A1 | 9/2009 | Perkins | |
| 2016/0063774 | A1 * | 3/2016 | Afshar | G07C 5/006 701/29.1 |
| 2016/0299942 | A1 * | 10/2016 | Li | G06Q 10/0875 |
| 2017/0148102 | A1 * | 5/2017 | Franke | G06Q 10/20 |
| 2018/0300576 | A1 * | 10/2018 | Dalyac | G06K 9/6263 |
| 2019/0072933 | A1 * | 3/2019 | Wu | G05B 19/4099 |

* cited by examiner

*Primary Examiner* — Vincent H Tran
(74) *Attorney, Agent, or Firm* — Cantor Colburn LLP

(57) ABSTRACT

A method of determining how to repair a damaged composite component includes generating a three-dimensional model of the damaged component, determining a configuration of a repair structure to be applied to the damaged component using the generated three-dimensional model and general design data for the component prior to being damaged, determining an operational feasibility of the determined repair structure using application specific information related to the damaged component and generating a repair procedure for forming the repair structure when the determined operational feasibility indicates that the damaged component can be successfully repaired.

19 Claims, 3 Drawing Sheets

COMPOSITE REPAIR DESIGN SYSTEM

BACKGROUND

The subject matter disclosed herein generally relates to systems and methods for repairing structures comprised of composite materials, and in particular, to methods and systems for effecting such repairs with limited resources and time.

The use of structures comprised of composite materials has grown in popularity, particularly in such applications as aircraft airframes, where benefits include increased strength and rigidity, reduced weight and reduced parts count. When damaged, however, composite structures often require extensive repair work. Current maintenance procedures frequently require that the damaged component be removed and replaced before the aircraft can resume flying.

The complex repairs required are typically only executed in settings where extensive composite manufacturing and engineering capability are available. Accordingly, insufficient resources in most operational settings reduce the range of repair capability. As a result, the aircraft is frequently required to be removed from service and relocated for repair, thereby increasing the downtime of the aircraft and adding significantly to the support costs of the aircraft.

BRIEF DESCRIPTION

According to one embodiment, a method of determining how to repair a damaged composite component includes generating a three-dimensional model of the damaged component, determining a configuration of a repair structure to be applied to the damaged component using the generated three-dimensional model and general design data for the component prior to being damaged, determining an operational feasibility of the determined repair structure using application specific information related to the damaged component and generating a repair procedure for forming the repair structure when the determined operational feasibility indicates that the damaged component can be successfully repaired.

In addition to one or more of the features described above, or as an alternative, in further embodiments the determining the operational feasibility comprises using component specific information, including manufacturing data, usage data, and maintenance data associated with the damaged component.

In addition to one or more of the features described above, or as an alternative, in further embodiments the generating the three-dimensional model includes receiving incident data at an engineered surface generator, and the engineered surface generator generating the three-dimensional model using the received incident data.

In addition to one or more of the features described above, or as an alternative, in further embodiments the incident data includes information related to a location and an extent of damage of the damaged component.

In addition to one or more of the features described above, or as an alternative, in further embodiments the determining the repair structure to be applied to the damaged component further includes providing general design data to a parametric repair modeling module.

In addition to one or more of the features described above, or as an alternative, in further embodiments general design data includes at least one of geometric data, structural requirements, and material data of the component prior to being damaged.

In addition to one or more of the features described above, or as an alternative, in further embodiments the generated repair procedure includes step by step instructions for winding a plurality of plies about a tool.

In addition to one or more of the features described above, or as an alternative, in further embodiments comprising identifying the parameters for each of the plurality of plies to be used in the generated repair procedure.

In addition to one or more of the features described above, or as an alternative, in further embodiments comprising generating instructions for fabricating a tool upon which plies are cured during the generated repair procedure.

In addition to one or more of the features described above, or as an alternative, in further embodiments comprising fabricating the tool using generated three-dimensional model of the damaged component.

In addition to one or more of the features described above, or as an alternative, in further embodiments the generated repair procedure includes instructions for curing the plurality of plies on the tool to form the repair structure.

In addition to one or more of the features described above, or as an alternative, in further embodiments comprising forming the determined repair structure via the generated repair procedure.

In addition to one or more of the features described above, or as an alternative, in further embodiments the forming the determined repair structure occurs at a remote location from a location where the generating the repair structure to be applied to the damaged component occurs.

According to another embodiment, a computer system for optimizing a repair procedure of a damaged composite component includes an engineered surface generator for generating a three-dimensional model of the damaged component using received incident data and a parametric repair modeling module for identifying a configuration of a repair structure using the three-dimensional model and general component information. A tool design module generates a tool design for a tool for preparing the repair structure associated with the damaged component using the three-dimensional model and an analytic module is operable to evaluate the operational feasibility of the identified configuration of the repair structure generated by the parametric repair modeling module in view of application specific information. A repair laminate configuration module is configured to identify one or more parameters associated with a formation of an operationally feasible repair structure and a repair procedure module is configured to automatically develop a repair procedure for forming the operationally feasible repair structure using the tool generated by the tool design module and the one or more parameters identified by the repair laminate configuration module.

In addition to one or more of the features described above, or as an alternative, in further embodiments comprising a manufacturing machine in communication with the tool design module, the manufacturing machine being operable to fabricate the tool using the tool design generated by the tool design module.

In addition to one or more of the features described above, or as an alternative, in further embodiments the manufacturing machine is located remotely from the computer system.

In addition to one or more of the features described above, or as an alternative, in further embodiments the tool generated by the tool design module corresponds to the three-dimensional model of the damaged component.

In addition to one or more of the features described above, or as an alternative, in further embodiments the repair procedure includes step by step instructions for laying up a plurality of plies upon the tool.

In addition to one or more of the features described above, or as an alternative, in further embodiments the step by step instructions for laying up a plurality of plies upon the tool include at least one of a total number of the plurality of plies, a material of the plurality of plies, a size of the plurality of plies, an orientation of the plurality of plies, and an order for laying the plies.

In addition to one or more of the features described above, or as an alternative, in further embodiments the repair procedure further includes a curing process for curing the plurality of plies to form the repair structure.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
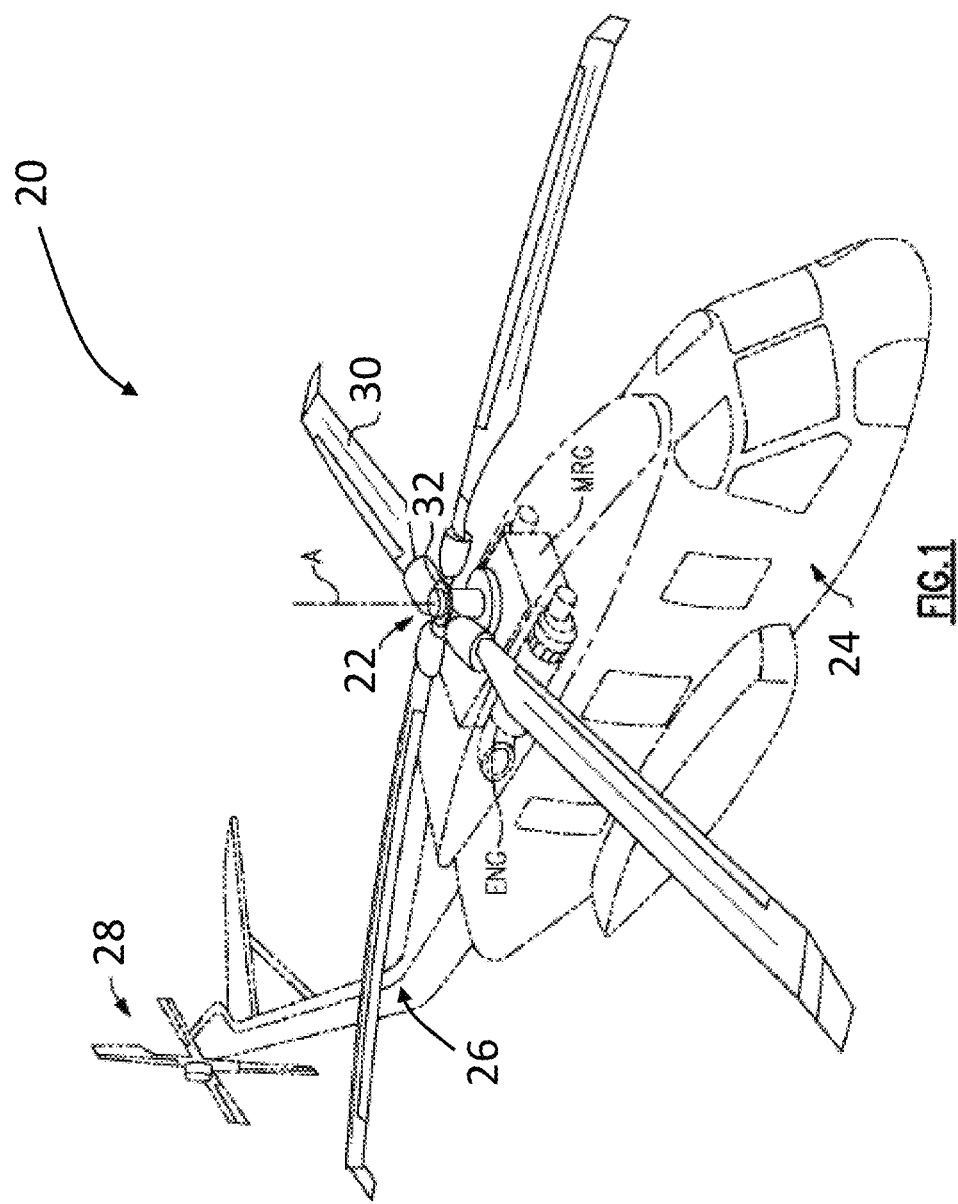
FIG. 1 is a perspective view of an example of a rotary wing aircraft.

FIG. 1 schematically illustrates an example of a vertical take-off and landing (VTOL) rotary wing aircraft 10. The aircraft includes a main rotor system 22 supported by an airframe 24 having an extending tail 26 which mounts an anti-torque system 28, such as a tail rotor system. While shown as an anti-torque system 28, it is to be understood the anti-torque system 28 can be a translational thrust system, a pusher propeller, a rotor propulsion system, and the like in addition to or instead of the shown anti-torque system. The main rotor system 22 includes a plurality of rotor blade assemblies 30 mounted to a rotor hub 32. The main rotor system 22 is driven about an axis of rotation A through a main gearbox (illustrated schematically at MRG) by one or more engines ENG. The main gearbox MRG may be interposed between the one or more engines ENG, the main rotor system 22, and the anti-torque system 22. The main gearbox MRG is mechanically connected to the main rotor system 20 and to the anti-torque system 22 so that the main rotor system 22 and the anti-torque system 28 may both be driven by the main rotor gearbox MRG. Although a particular helicopter configuration is illustrated and described in the disclosed embodiment, other configurations aircrafts and vehicles, such as high speed compound rotary wing aircrafts with supplemental translational thrust systems, dual contra-rotating, coaxial rotor system aircrafts, tilt-rotors and tilt-wing aircrafts, and fixed wing aircraft, may also benefit from embodiments of the disclosure.

Figure 2:
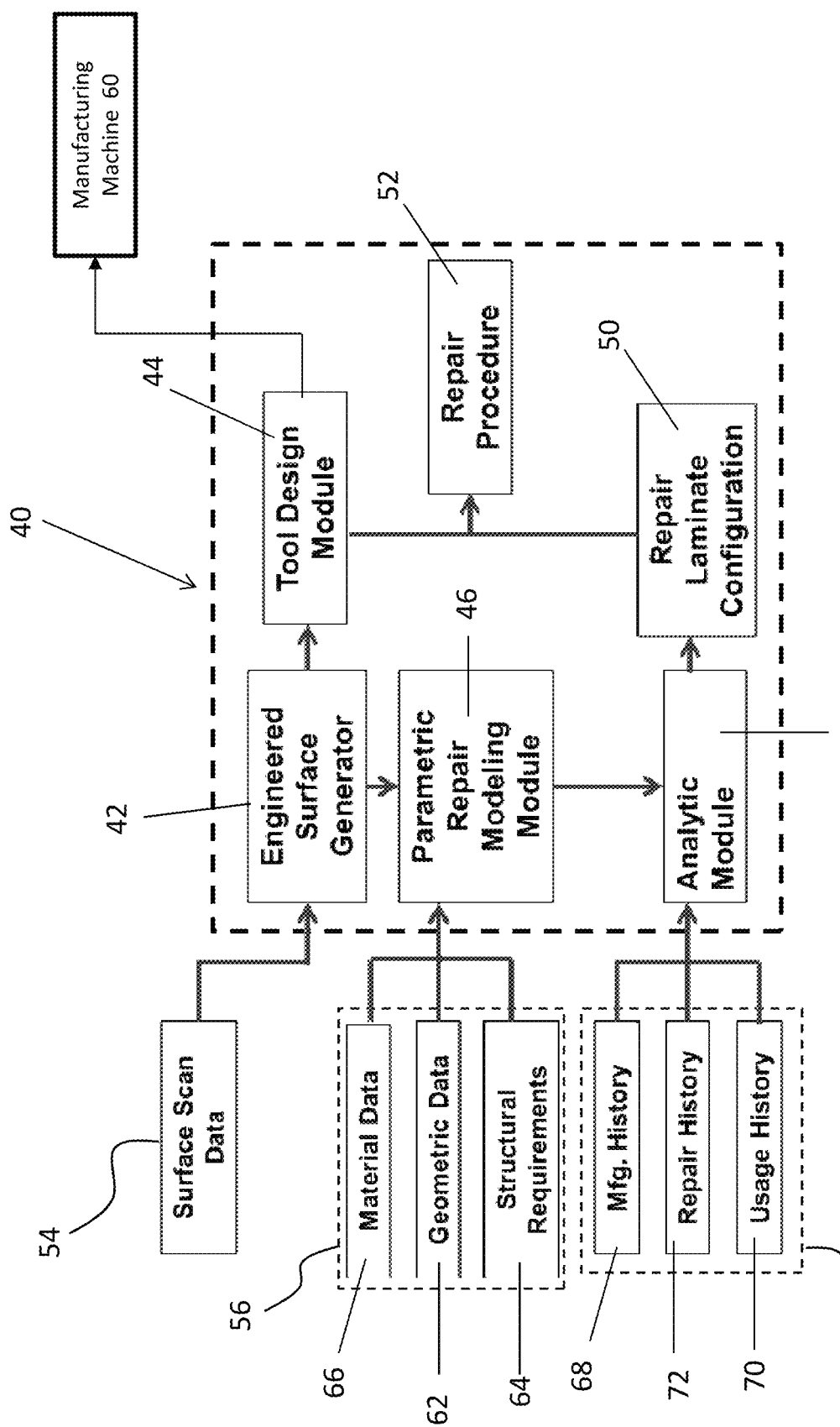
FIG. 2 is schematic diagram of a system for including an including an optimization algorithm according to an embodiment.
Figure 3:
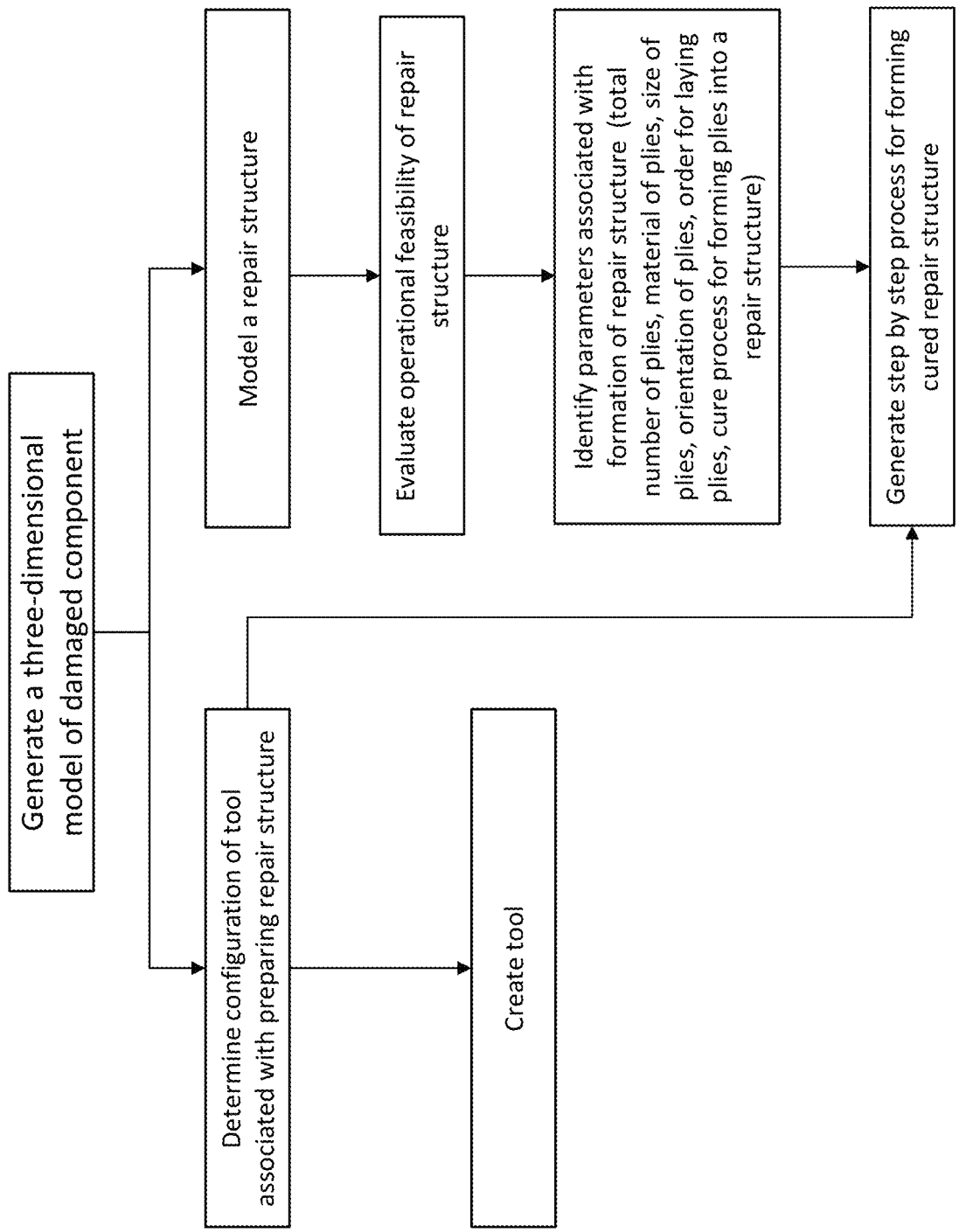
FIG. 3 is a method of utilizing the system of FIG. 2 according to an embodiment.

One or more components of an aircraft, such as rotary wing aircraft 20 for example, are fabricated from composite materials. These components, such as the airframe 24 for example, may wear or suffer damage over time, thereby requiring maintenance and/or replacement. With reference now to FIG. 2, a system 40 for optimizing a repair procedure of a composite material or component is illustrated schematically. The system 40 disclosed herein enables the evaluation of structural damage and fabrication of a repair structure in an operational setting. Although the system 40 is illustrated and described with respect to an aircraft, it should be understood that such a system may be adapted for use in any application including composite materials, such as vehicles and water crafts for example.

As shown, the system 40 is a computer system which includes an engineered surface generator 42, a tool design module 44, a parametric repair modeling module 46, an analytic module 48, a repair laminate configuration module 50, and a repair procedure module 52. Various types of data may be provided to different components of the system 40. In an embodiment, the data provided to the computer system 40 includes at least one of incident data 54, general component information 56, and application specific data 58.

The engineered surface generator 42 of the computer system 40 is configured to generate a computer or application based three-dimensional model of a damaged component or structure. In an embodiment, incident data 54 associated with the damaged component is provided as an input to the engineered surface generator 42. The incident data 54 may include information related to the location and extent of the damage of the component. In an embodiment, the incident data 54 includes a scanned topology of the surface of the damaged component. The incident data 54 could be provided by a separate computer, tablet, or smart phone which connects to the engineered surface generator 42 through wired and/or wireless network connections.

The engineering surface generator 42 is additionally arranged in communication with the tool design module 44. The three dimensional model created by the engineered surface generator 42 may be output to the tool design module 44 where a tool associated with preparing a repair structure associated with the damaged component is formed. In an embodiment, the tool design module 44 acts as an interface with a three-dimensional printer or other manufacturing machine, illustrated schematically at 60, external to the computer system 40, capable of creating a tool (not shown) having a geometry corresponding to the damaged component. In an embodiment, the tool design module 44 is operable to control the manufacturing machine 60 to generate the tool identified by the tool design module 44. In this way, the operator who provided the incident data 54 would receive the tool necessary to conduct a particular repair. It is understood that the tool need not be generated in all aspects of the invention such as where the tool design module 44 identifies known tools available to the operator without having to generate a tool, and therefore that machine 60 is optional.

The parametric repair modeling module 46 of the computer system 40 is configured to identify or model a repair structure to be applied to the damaged component in response to one or more inputs. The inputs provided to the parametric repair modeling module 46 may include general data 56 associated with the component, as well as the output of the three dimensional model created by the engineered surface generator 42. In an embodiment, one of the inputs provided as general data 56 to the parametric repair modeling module 46 includes geometric data, illustrated at 62, indicating the geometry associated with the new or original structure of the damaged component. Another of the general data inputs may include the structural requirements 64 of the component. These structural requirements 64, for example the stress or strain that the component must be required to withstand, provide the basis for the original construction of the damaged component. Material data, such as the material properties and repair limits associated with the damaged component, illustrated at 66, and information associated with the three-dimensional model generated by the engineered surface generator 42 may also be input as general data 56 to the parametric repair modeling module 46. Based on this data, the parametric repair modeling module 46 generates a proposed repair structure. The various types of general data 56 may be provided to the parametric repair modeling module 46 either manually, or by a computing device, such as a computer, tablet, or smart phone for example, which connects to the computer system 40 through a wired and/or wireless network connection.

An analytic module 48 is arranged in communication with the parametric repair modeling module 46 and receives the generated proposed repair structure generated by the parametric repair modeling module 46. The analytic module 48 is configured to evaluate the operational feasibility of the proposed repair structure generated by the repair modeling module 46 in view of application specific information 58. The application specific information 58 may be stored within a database that is part of the computer system 40, or alternatively, within a database separate from but accessible by the computer system 40. Alternatively, the application specific information 58 may be entered manually, such as by an operator using the computer system 40, or automatically, such as by another computing device. The application specification information 58 may include the manufacturing history or record of the component, illustrated at 68. The manufacturing history may include not only information about when and where the component was fabricated, but also information such as deviations and tolerances associated therewith. The usage history of the aircraft and/or the component, illustrated at 70, may also be supplied to the analytic module 48. In some embodiments, the usage history 70 may be directly or indirectly communicated to the analytic module 48 from a system of the aircraft, such as a health monitoring system or other system configured to monitor the stress placed on a desired component during operation of the aircraft. The analytic module 48 may additionally receive information related to the maintenance history and previous damage experienced by the component, shown at 72.

Upon determining that the damaged component is capable of being repaired, the analytic module 48 communicates repair information including the repair model generated by the parametric repair modeling module 46 to a repair laminate configuration module 50. The repair laminate configuration module 50 identifies one or more parameters associated with the formation of a repair structure. For example, these parameters may include the total number of plies, the material of the plies, the size of the plies, the orientation of the plies, the order for laying the plies, and the cure process for forming the plurality of plies into a repair structure.

An output from both the repair laminate configuration module 50 and the tool design module 44 are provided as inputs to a repair procedure module 52. In response, the repair procedure module 52 automatically generates a step by step process for forming a cured structure, including how to wrap each of the plies identified in the repair laminate configuration module 50 about or upon the three-dimensional tool designed by the tool design module 44 and formed by the manufacturing machine 60. In an embodiment, the repair procedure module 52 may additionally provide instructions to an operator regarding how to attach the formed repair structure to the damaged component.

It should be understood that one or more of the various entities described with respect to system 40 need not be arranged at a single location. For example, the tool design module 44 may be located remotely from the parametric repair modeling module 46. Accordingly, the optimization performed by the system 40 may occur at a first location and the implementation of the repair procedure and/or fabrication of the tool may occur at a second remote location.

The computing system 40 illustrated and described herein customizes a specific composite repair structure and procedure for each instance where the need for a repair is identified. Further, by allowing maintenance personnel to perform in situ repairs on an aircraft at their deployed location not only increases the operational availability of the aircraft, but also reduces the cost of performing such repairs.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of determining how to repair a damaged composite component comprising:
   generating a three-dimensional model of the damaged component;
   determining a configuration of a repair structure to be applied to the damaged component to repair the damaged component using the generated three-dimensional model and general design data for the component prior to being damaged;
   identifying a configuration of a tool to be used to form the repair structure;
   determining an operational feasibility of the determined repair structure using application specific information related to the damaged component; and
   generating, in response to the configuration of the repair structure and the configuration of the tool, a repair procedure for forming the repair structure when the determined operational feasibility indicates that the damaged component can be successfully repaired, wherein generating the repair procedure includes generating instructions for fabricating the tool during the generated repair procedure.

2. The method of claim 1, wherein the determining the operational feasibility comprises using component specific information, including manufacturing data, usage data, and maintenance data associated with the damaged component.

3. The method of claim 1, wherein the generating the three-dimensional model includes receiving incident data at an engineered surface generator, and the engineered surface generator generating the three-dimensional model using the received incident data.

4. The method of claim 3, wherein the incident data includes information related to a location and an extent of damage of the damaged component.

5. The method of claim 1, wherein the determining the repair structure to be applied to the damaged component further includes providing general design data to a parametric repair modeling module.

6. The method of claim 5, wherein general design data includes at least one of geometric data, structural requirements, and material data of the component prior to being damaged.

7. The method of claim 1, wherein generating the repair procedure includes providing step by step instructions for winding a plurality of plies about the tool.

8. The method of claim 7, further comprising identifying the parameters for each of the plurality of plies to be used in the generated repair procedure.

9. The method of claim 7, wherein the generated repair procedure includes instructions for curing the plurality of plies on the tool to form the repair structure.

10. The method of claim 1, wherein further comprising fabricating the tool using generated three-dimensional model of the damaged component.

11. The method of claim 1, further comprising forming the determined repair structure via the generated repair procedure.

12. The method of claim 11, wherein the forming the determined repair structure occurs at a remote location from a location where the generating the repair structure to be applied to the damaged component occurs.

13. A computer system for optimizing a repair procedure of a damaged composite component comprising:
   an engineered surface generator for generating a three-dimensional model of the damaged component using received incident data;
   a parametric repair modeling module for identifying a configuration of a repair structure using the three-dimensional model and general component information, wherein the repair structure is configured to be applied to the damaged component to repair the damaged component;
   a tool design module for generating a tool design for a tool for preparing the repair structure associated with the damaged component using the three-dimensional model;
   an analytic module for evaluating the operational feasibility of the identified configuration of the repair structure generated by the parametric repair modeling module in view of application specific information;
   a repair laminate configuration module configured to identify one or more parameters associated with a formation of an operationally feasible repair structure; and
   a repair procedure module configured to automatically develop a repair procedure for forming the operationally feasible repair structure using the tool generated by the tool design module and the one or more parameters identified by the repair laminate configuration module.

14. The system of claim 13, further comprising a manufacturing machine in communication with the tool design module, the manufacturing machine being operable to fabricate the tool using the tool design generated by the tool design module.

15. The system of claim 14, wherein the manufacturing machine is located remotely from the computer system.

16. The system of claim 13, wherein the tool generated by the tool design module corresponds to the three-dimensional model of the damaged component.

17. The system of claim 13, wherein the repair procedure includes step by step instructions for laying up a plurality of plies upon the tool.

18. The system of claim 17, wherein the repair procedure further includes a curing process for curing the plurality of plies to form the repair structure.

19. The system of claim 13, wherein the step by step instructions for laying up a plurality of plies upon the tool include at least one of a total number of the plurality of plies, a material of the plurality of plies, a size of the plurality of plies, an orientation of the plurality of plies, and an order for laying the plies.

* * * * *